May 15, 1973                P. JENSEN, JR                3,733,206
CONTINUOUS PROCESS FOR THE MANUFACTURE OF CEREAL FOOD PRODUCTS
Filed July 13, 1970                                  4 Sheets-Sheet 1
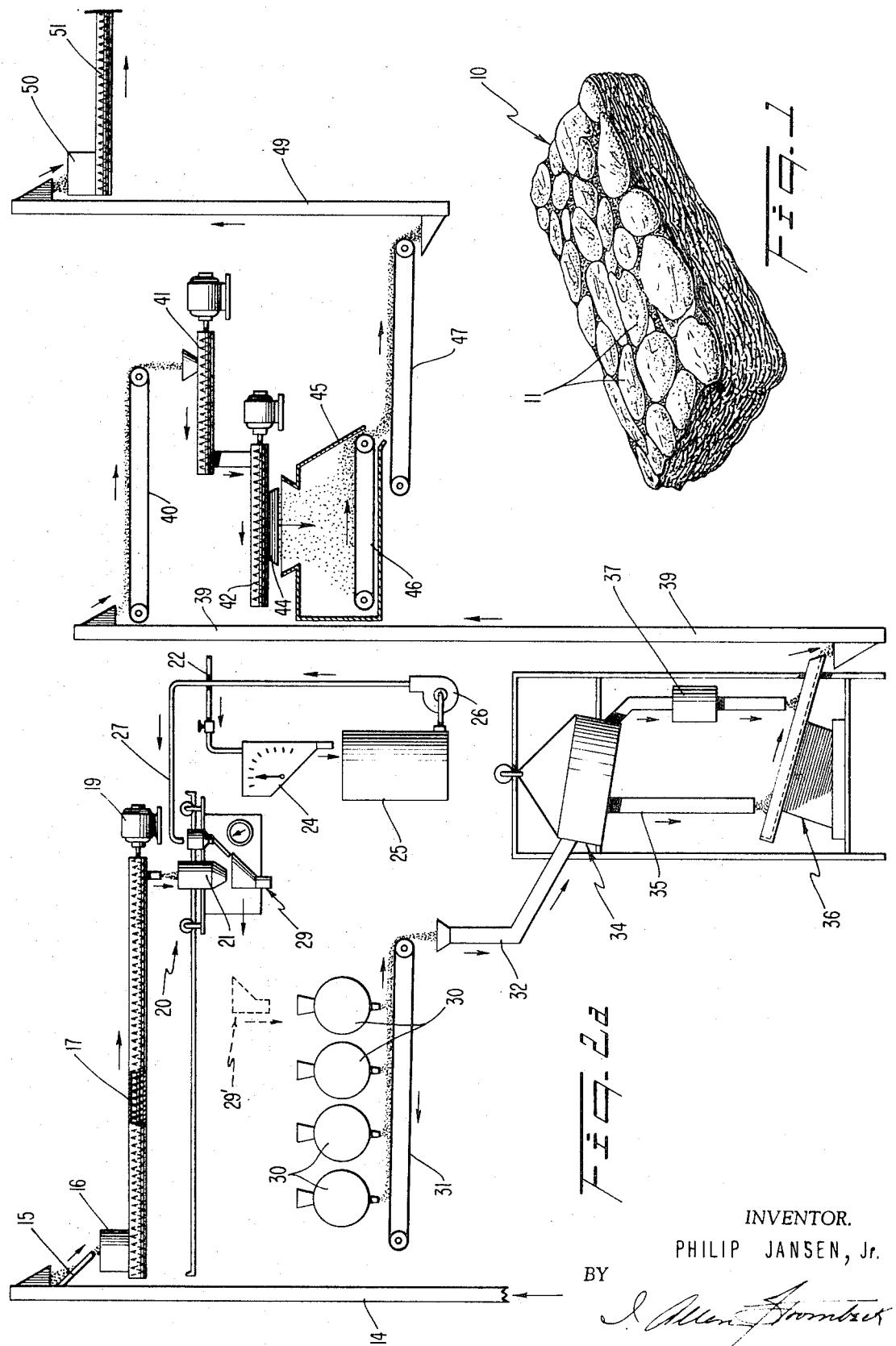
INVENTOR.
PHILIP JANSEN, Jr.
BY
PATENT AGENT

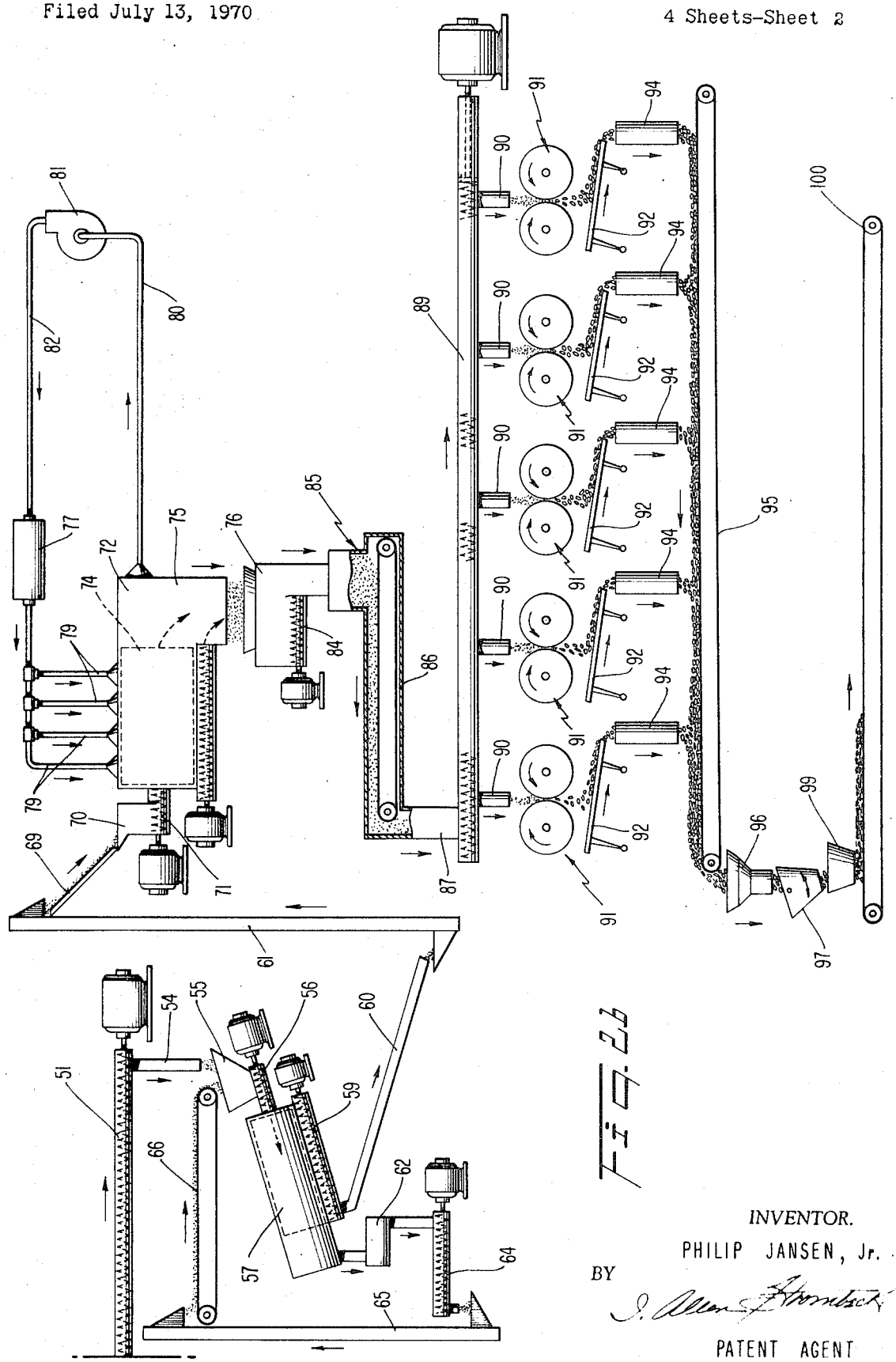

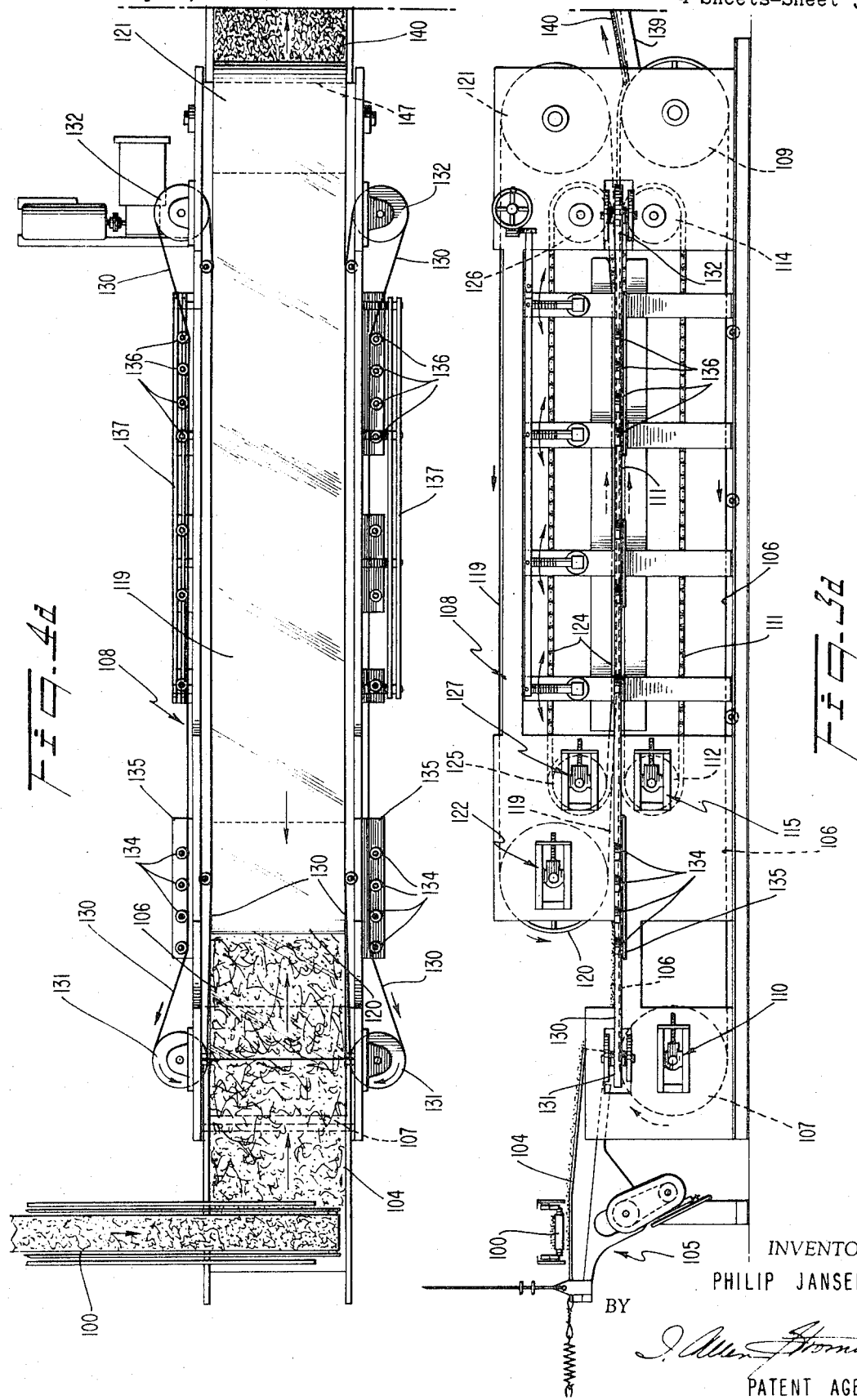

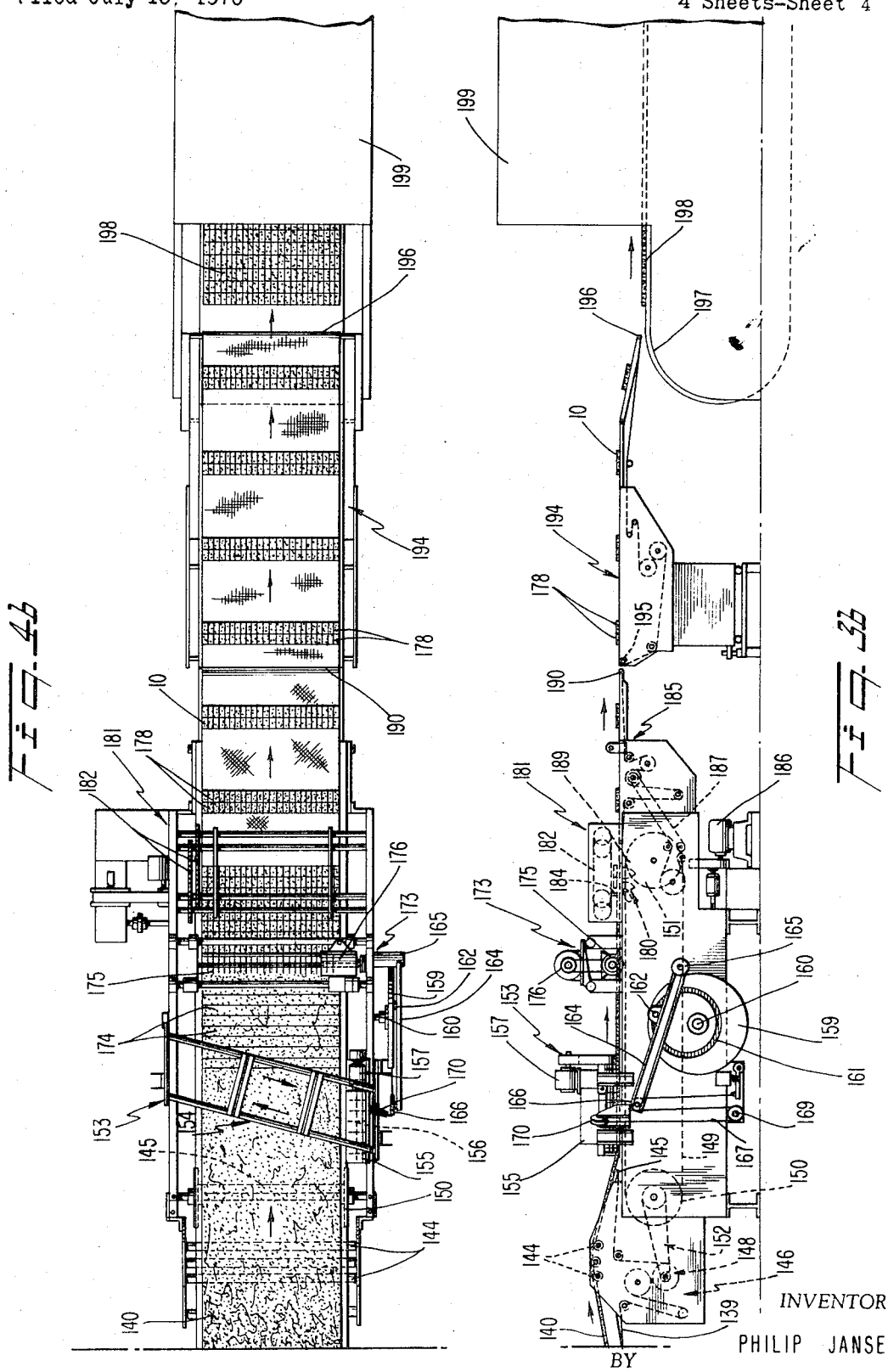

United States Patent Office 3,733,206
Patented May 15, 1973

3,733,206
CONTINUOUS PROCESS FOR THE MANUFACTURE OF CEREAL FOOD PRODUCTS
Philip Jansen, Jr., Westport, Conn., assignor to National Biscuit Company
Filed July 13, 1970, Ser. No. 54,098
Int. Cl. A23l 1/10
U.S. Cl. 99—80 R 13 Claims

ABSTRACT OF THE DISCLOSURE

Cooked cereal grain is rolled to form thin flakes which are compressed under heavy pressure to provide a continuous flowing sheet or sheet-like form of compressed cereal laminations. As the sheet advances on a continuously moving conveyor band it is first cut by a transversely reciprocating assembly of rotating disc cutters and subsequently cut into longitudinal strips by a second assembly of rotating disc cutters to form a continuously advancing sheet of rectangular shaped biscuits. The product is then baked and toasted to form a crunchy flaked biscuit which will maintain its crispness upon contact with aqueous liquids such as milk or cream.

---

This invention relates to a cereal food product and its manufacture, and more particularly to improved methods of making compressed biscuit-type cereal food products composed of flaked cereal grain.

The invention generally is concerned with the provision of a biscuit-type cereal food product composed of cooked, compressed and toasted cereal grain wherein the grain has been uniformly and completely cooked and the flakes formed thereof have been subsequently baked in biscuit form.

The objects of the present invention include the provision of a biscuit-shaped cereal product having an improved texture and pleasing taste.

Another object is to provide a dry, flaked cereal which does not become rancid when stored, and which has high crispness and moisture-absorbency. A further object is to provide a novel and improved method of producing a flaked cereal biscuit without the use of biscuit-shaped molds.

A still further object is to provide an improved and economical method of producing an improved flaked cereal biscuit continuously at higher production rates than currently prevailing.

These and other objects are accomplished by the improved method and production comprising the invention, preferred embodiments of which are illustrated by way of example in the accompanying drawings, and described in detail herein. Various modifications and changes in details may be made in the process and product within the scope of the claims appended hereto.

The invention accordingly comprises the elements and combinations of elements, steps and sequence of steps, features of construction and manipulation, and arrangements of parts which will be exemplified in the structures, and constructions hereinafter described, and the scope of the application of which will be indicated in the subsequent claims.

In the accompanying drawings, in which several of the various possible embodiments of the invention are illustrated:

FIG. 1 is a perspective view of an individual cereal biscuit as formed according to the method and apparatus of this invention;

FIG. 2a is a flow sheet diagram illustrating part of the apparatus for preparing and shaping the grain into cereal flakes according to the process;

FIG. 2b is a continuation of the flow sheet diagram shown in FIG. 2a;

FIG. 3a is a side elevation illustrating in reduced scale a cereal flake compressor for making a continuous sheet of compressed cereal flakes which discharge from the apparatus to the apparatus shown in FIG. 3b;

FIG. 3b is a continuation of FIG. 3a, the section of the apparatus there shown including means for successively cutting the compressed sheet transversely and then longitudinally to form a continuously advancing sheet of biscuits;

FIG. 4a is a plan view of the cereal flake compressor shown in FIG. 3a; and

FIG. 4b is a plan view of the equipment shown in FIG. 3b for carrying out the process of the invention.

Referring now to the drawings, there is shown in FIG. 1 a typical cereal biscuit product made by the method of the present invention. Such biscuit is made up of a plurality of layers of flakes 11, made by flattening or rolling individual cooked cereal grains which have been so treated as to be adherent to each other. In the embodiment shown, the biscuit is rectangular in shape, although within the broader aspects of the invention it may be of various other shapes. The flakes 11 are oriented so that their broad planar surfaces lie generally parallel to the broad faces of the biscuit.

Because the biscuits 10 contain only flaked compacted cereal grains, they do not become rancid when stored; they also have high crispness and moisture-absorbency. When immersed in milk, the biscuits swell to a substantial extent, and present a pleasing texture and taste. The biscuits resist crumbling to any substantial extent before use, because of the high pressure to which the flaked grains have been subjected and the orientation of the flakes before compression so that their broad extents lie parallel to each other and normal to the direction of the compressive force to which the flakes have been subjected. Each flake thus has extensive surface contact with its neighbors in the compressed product.

Typical apparatus employed in carrying out the method is shown somewhat schematically partially in side elevation and partially in vertical section in FIGS. 2a, 2b, 3a and 3b. Such figures, when connected end-to-end, show the apparatus employed in carrying out the method from start to finish. The apparatus of FIGS. 3a and 3b is shown in plan in FIGS. 4a and 4b, respectively.

The start of the present process is, as shown at the lower left in FIG. 2a, where the lower end of a bucket elevator 14 feeds grain such as wheat, from small wheat bins (not shown). It is to be understood that the process with modifications apparent to those skilled in the art, is also applicable to other cereal grains such as oats, corn, rice, etc. At its upper end, the bucket elevator 14 discharges the wheat onto an inclined chute 15 which feeds it into a surge hopper 16 at the entering end of a screw conveyor 17 which is driven by a motor 19, as shown. The conveyor 17 discharges the wheat into the hopper 21 of a batch weigher 20; from the hopper 21 the wheat is discharged into a lower hopper 29 where it is held temporarily while a predetermined desired amount of water is added to it. A hot water supply pipe 22 leads to a hot water metering tank 24 which discharges into a flavor tank 25 disposed therebeneath. Water is discharged from the flavor tank by a pump 26 upwardly through a pipe 27 which has a nozzle discharging into a small funnel-like device 28 which, in turn, discharges into the aforementioned funnel device 29.

The funnel arrangement 29, containing the desired amount of grain such as wheat, and water, is moved into successively different positions in each of which it feeds its contents into a respective cooker 30; four aligned cookers 30 are schematically shown in the illustrative embodiment. After each of the cookers 30 has cooked its contents for a desired amount of time, it discharges the cooked contents upon a belt conveyor 31 which feeds the cooked grain into the upper end of a chute 32 leading to a cooling reel 34. The cooling reel, which is of conventional construction, may, for example, have a plurality of spaced perforations 3/8" in diameter in its bottom wall and a plurality of perforations of somewhat larger diameter in the bottom portion of its sidewall. The reel, which is tipped as shown, is rotated about its axis. Aggregates of the cooked grain which have a diameter of 3/8" or less pass downwardly through the perforation of the bottom of the reel into a discharge chute 35 and thence onto a vibrating or shaker table device 36. Aggregates of the cooked grains which have a diameter of greater than 3/8" pass through the lower sidewall of the reel into a second discharge chute and thence into a lump breaker 37, which breaks up the lumps or oversized aggregates to a size of 3/8" or less and then discharges them to the shaker table device 36.

The cooked grains deposited upon the shaker device are discharged from the lower end thereof into the lower end of a bucket elevator 39. The elevator carries the grains upwardly and discharges them from its upper end onto a driven horizontal belt 40. Belt 40 discharges the grains into the feeding hopper of a screw conveyor 41 which feeds the grain to the left (FIG. 2a) and discharges it into the entering end of a further horizontal conveyor 42. Conveyor 42 has an elongated discharge port 44 intermediate the length thereof, the discharge port 44 being disposed above a tempering bin 45 in which it is held for some time in order to become of uniform temperature and to have a uniform moisture content.

A horizontal conveyor 46, disposed within the tempering bin 45 at the bottom thereof, feeds the tempered grain at the desired rate onto the left hand, entering end, of a horizontal belt conveyor 47 which feeds the grain to the right. Grain discharged from the right hand of conveyor 47 falls into a hopper at the lower end of a vertical bucket elevator 49 which discharges the grain at its upper end into a surge hopper 50 from which the grain, in turn, is fed to the entering end of a horizontal driven screw conveyor 51.

Turning now to FIG. 2b, it will be seen that the conveyor 51 discharges the grain from its right hand end into a vertical chute or conduit 54 which discharges the grain into a surge hopper 55 from which the grain is discharged by an inclined screw conveyor 56. Conveyor 56 feeds the grain into an inclined casting 57 which contains one or more scalping reels having perforated peripheral walls through which the grain is discharged, in the form of sized aggregates, through an elongated port at the bottom of the housing 57, such elongated port communicating with the casing of a lower, inclined screw conveyor 59. At the left hand end of conveyor 59 grain is discharged through an inclined chute or conduit 60 which feeds grain into the lower end of a vertical bucket conveyor 61.

Aggregates of grain which escape from the scalping reels in the housing 57 by passing through the open lower left hand end of the reels fall into a lump breaker 62; the lump breaker 62 discharges the aggregates into a horizontal screw conveyor which in turn discharges the grain into the lower end of a vertical bucket elevator 65 which returns the grain by way of a horizontal belt conveyor 66, to the hopper 55 at the entering end of the screw conveyor 56.

Cereal fed by the bucket elevator 61 is discharged from the upper end thereof onto an inclined chute 69 from which it is discharged into a surge hopper 70. A driven screw conveyor 71 at the bottom of the surge hopper 70 discharges the grain into a heating reel device having an enclosure 72 within which there is a horizontal driven heating reel 74. Grain which is heated in the heating reel device, in a manner to be described, is discharged at the right hand end thereof into a hood 75 and then into a surge hopper 76 of a "Merchen" feeder 85.

Air is exhausted from the hood 75 through one or more conduits 80 which lead to the input port of a suction fan 81. The exhaust or pressure port of the fan 81 is connected by a conduit 82 to a heat exchanger 77 where it is heated to the desired temperature. The heater 77 discharges the heated air to a manifold and vents into a plurality of input ducts 79 connected to the top of a heating reel enclosure 72.

The surge hopper 76 of the Merchen feeder 85 is provided with a horizontal driven screw conveyor 84, as shown, the grain progressing downwardly through the feed hopper of the feeder onto the right hand end of a horizontal belt conveyor 86 at the bottom of the Merchen feeder, and impelling the grain in the direction from right to left. The grain is discharged from the feeder through a vertical duct 87 from which it is fed to an entry port at the left hand end of an elongated screw conveyor 89. Spaced longitudinally of the conveyor 89 are a plurality of discharge chutes 90, each such chute feeding cooked tempered grain to a respective pair of opposed driven flaking rolls 91. The flaking rolls flatten the grains as they pass between them, the flattened grains falling upon a respective inclined table 92 on which they progress downwardly toward the right, finally being discharged into respective vertical chutes or conduits 94.

The conduits 94 discharge the flaked grains onto a horizontal driven belt conveyor 95 the upper, operative run of which travels in a direction from right to left. Grain is discharged from the left hand end of conveyor 95 into a funnel-shaped hopper 96, from which it is discharged into a manually tiltable hopper 97 which permits an operator to tilt it so as to bypass rejected grains. Grains are selectively discharged from the lower end of the tiltable hopper 97 into a fixed hopper 99 from which the grains are discharged onto the left hand end of a horizontal driven belt conveyor 100 which travels in the direction from left to right.

As shown in FIGS. 3a and 4a, the discharge end of the belt conveyor 100 overlies the left hand end (FIGS. 3a and 4a) of a table device 104, the left hand portion of which has an upper surface which lies horizontal and the right hand end of which has a surface which inclines downwardly toward the right. The table 104 is driven by a vibrating device 105, of conventional construction, which spreads out the cereal delivered to the table 104 by the conveyor 100 to form a layer of cereal of uniform thickness upon the table and to forward such uniform layer of cereal in the direction from left to right. The vibrating table 104 not only conveys the flaked cereal grains to the compressor mechanism, but it fluffs the flakes so that their broad extent lie generally horizontal. The center of gravity of each flake tends to orient it flatwise as it falls. Such layer of cereal is now treated in a continuous compression device 108 from which it is discharged as a flat sheet of compacted cereal flakes grain. Such sheet, which is designated 140, is of such character as to be self-sustaining throughout the various cutting and conveying operations to which it is subsequently subjected. The cereal flakes retain substantially the orientation in sheet 140 which they had after orientation by table 104.

The continuous compression device 108 is made up of generally horizontal upper and lower, conveyors having progressively converging belts 119 and 106, respectively, which shape and define the upper and lower surfaces of the sheet product 140, and belt conveyors having vertically disposed belts 130 at the opposite sides of the pass formed between the upper and lower compressor belts which laterally close the pass between them.

The lower compressor belt, designated 106, is entrained over a rear pulley drum 107 and a forward pulley drum 109, which is driven by a means not specifically shown.

The belt 106 is maintained under very high tension by appropriate adjustment of belt tightening means 110 provided at the rear pulley drum 107. In order to maintain the intermediate span of the belt 106 from appreciable sagging under the very substantial pressure exerted by the cereal being compressed, the lower surface of the upper operative run of such belt 106 is backed up by a chain 111. Chain 111 is entrained over a rear sprocket 112 and a forward sprocket 114, the rear sprocket 112 being selectively moved horizontally to tighten the chain by chain tightening means 115, as shown.

The upper compressor belt 119 is entrained over a rear pulley drum 120 and a forward pulley drum 121, the upper belt 119 being appropriately tightened by the belt tightener 122 at the rear pulley drum. The intermediate portion of the upper belt is similarly backed up by a chain 124 which is entrained over a rear sprocket 125 and a forward sprocket 126. Chain 124 is appropriately tightened by a chain tightener 127 at the rear sprocket 125.

As above-mentioned, there are provided two belts closing the sides of the elongated pass between the upper and lower compressor belts 119 and 106, respectively. The side belts, which are similar but are mounted in a reverse manner, are both designated 130. Each of such belts is entrained over a rear pulley 131 having a vertical axis and over a forward pulley 132 likewise having a vertical axis. Rear, back-up rolls 134, supported in fixed frame structures 135, engage the laterally outer surfaces of the operative runs of the belts 130 adjacent the entering end of the belt compressor. Supporting structures 137 are provided on each side of the intermediate portion of the compressor 108, as shown in FIG. 4a. Adjustably supported in the frame structures 137 are a plurality of back-up rolls 136 rotating on vertical axes, such rolls engaging the laterally outer surface of the operative run of the respective belt 130. Belts 130 are driven, by means only generally indicated, at the same surface speed as the upper and lower horizontal compressor belts 119 and 106.

The flat, self-sustaining sheet of compacted cereal flakes, shown at 140, discharged from the compressor is received upon a driven belt conveyor 139 the vertically thin left hand end of which (FIG. 3a) acts somewhat as a doctor blade to pick such product 140 off the lower compressor belt 106. Such conveyor 139 may be formed of a frame structure, only generally shown, having a relatively thin cross member at the left hand end of the conveyor, over which the belt of such conveyor runs, whereby to form such thin entering end 147 of the conveyor.

Turning now to FIGS. 3b and 4b, it will be seen that the conveyor 139 has the upper, operative run thereof inclined upwardly to the right to run over supporting rolls 144 and then downwardly to a vertically thin exit end 145. The conveyor 139 is driven by a belt driving and tightening means generally shown at 146, such means including two opposed driving rolls 148 which bend the conveyor belt of such conveyor into an S form.

The exit end 145 of the conveyor 139 overlies the upper operative run of a further driven belt conveyor having a belt 149 entrained over conveyor drums 150 at the rear and 151 at the forward end thereof, respectively. The above-mentioned means 148 for driving the conveyor 139 has the lower roll thereof drivingly connected to the drum 150 of the further conveyor, by a means 152 shown in FIG. 3b. The conveyor belt 149 carries the sheet cereal product 140 progressively through a transverse gang cutter mechanism, generally designated 153, which divides the sheet product into a plurality of similar transversely extending "sticks" and thence through a longitudinal gang cutter mechanism, generally designated 173, which divides the "sticks" into individual biscuits.

Briefly, the transverse gang cutting device includes a bridge 15 disposed above the path of travel of the sheet product 140 on the conveyor belt 149, the bridge being inclined upwardly and to the right as it is shown in FIG. 4b so that the gang cutter or saw traveling thereover functions to make transverse cuts in the traveling sheet product 140. The cutter carriage 155 reciprocates on the bridge 154, the carriage supporting a horizontally journalled gang cutter or saw 156 which is driven by a motor 157 supported on the carriage. Means are provided for reciprocating the carriage 155 in timed relationship with the travel of the sheet product 140 on the conveyor belt 139.

The driving means for the cutter carriage 155 includes a flywheel 159 which is carried by a horizontal transverse shaft 160 journalled in the frame of the machine. A circular cam track 161 disposed eccentric to the shaft 160 is formed in the outer side of the flywheel 159. A cam follower pin 162 is affixed to a lever 164 which is pivotally mounted at its forward end by a pivot pin or stub shaft 165 affixed to the frame of the machine. The lever 164 carries an idle pulley 166 at its outer free end, there being a belt or cord which rises from a fixed point of connection of the machine frame upwardly over the pulley 166 thence downwardly and partially around the pulley 169 affixed to the frame and thence upwardly over a canted pulley 170 and finally is connected to the cutter carriage 155.

Means not specifically shown constantly urges the cutter carriage 155 in an upward direction as it is shown in FIG. 4b and in a direction into the paper as it is shown in FIG. 3b. Upon the rotation of the shaft 160 and the flywheel 159 connected thereto, the cam track 161 and the cam follower 162 cause the lever 164 to be oscillated about the stub shaft 165. When the lever 164 is in its uppermost position, as it is shown in FIG. 3b, the cutter carriage 155 is pulled into the position thereof shown in FIGS. 3b and 4b. When the lever 164 lies in its lowermost position, however, the means biasing the cutter carriage upwardly in FIG. 4 causes the carriage to travel on the bridge 154 angularly across the product 140 thereby cutting it into a plurality of parallel transversely disposed "sticks" or stick members 174.

The stick members 174 continue to travel in closely spaced relationship upon the conveyor belt 149, such members then being acted upon by the longitudinal gang cutter 175 of mechanism 173, the gang cutter being fixedly connected to the frame of the machine and driven by a motor 176. The product is now in the form of a plurality of individual biscuits 10 which are arranged in transversely extending rows 178.

The apparatus shown provides means whereby such biscuits may be inspected prior to their being forwarded to an oven to be baked. For this purpose there is provided at 180, upstream of the forward drum 151 for the conveyor belt 149, means for progressively elevating two consecutive rows 178 of aligned biscuits 10. The two thus elevated rows 178 of biscuits are then acted upon by a biscuit row accelerating means 181 which includes two laterally spaced parallel chains 182 which are driven in timed relationship with but faster than the conveyor belt 149, the chains 182 carrying a depending transversely extending pusher bar 184 which engages the thus elevated rows 178 of biscuits 10. The chains 182 are driven at a markedly greater speed than the conveyor belt 149, and thus impels the two elevated rows 178 of biscuits to the right at a speed greater than those of the following rows 178.

The two elevated and accelerated rows 178 are discharged upon a conveyor 185 which is driven at substantially the speed of the chains 182, and thus faster than the conveyor belt 149, by motor 186, which also drives the conveyor belt 149, acting through a driving means 187. The upstream end 189 of the conveyor 185 underlies the forward end of the chains 182, so as to receive the two elevated biscuit rows 178 therefrom. Conveyor 185 discharges the successive pairs of rows of aligned biscuits 178 from its forward end 190 onto the entering end 195 of a feed-on conveyor 194, which is driven at the same speed as conveyor 185. The conveyor 194, which is of appreciable longitudinal extent, provides an operator adequate time in which to inspect the biscuits and to remove faulty ones from the rows 178 thereof traveling in a direction from left to right. The exit end 196 of a feed-on conveyor 194 overlies a further belt conveyor 197, which travels more slowly than the conveyors 185 and 194, so that the formerly spaced pairs of rows of biscuits 178 now form a compact divided sheet-like formation 198. Conveyor 197 carries the formation 198 slowly through an oven 199 in which they are baked and toasted and from which they emerge ready for packing and shipping.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A method of preparing a cereal product in biscuit form, comprising feeding cooked, tempered, flaked cereal grains to a continuous compressor mechanism which comprises a pair of opposed belts disposed one above the other, the lower belt having its upper operative run lying horizontal, said lower belt extending a substantial distance beyond the upper belt at the entrance end of the compressor mechanism, confronting operative runs of the belts being inclined somewhat to form a cereal compressing pass which converges in the direction from entrance to exit of the compressor mechanism, and driving the belts so that the opposed confronting runs of the belts travel in the same direction at the same speed, forming the cereal flakes into an uncompacted layer of substantially uniform thickness and orienting the flakes so that they lie generally parallel to the confronting runs of the belts by vibrating the grains on a vibratory table which is disposed a small distance above and which feeds the flakes forwardly toward the upstream end of the lower belt, and transferring said uncompacted layer of oriented flakes from the vibratory table to said upstream end portion of the lower belt.

2. A method according to claim 1, wherein the operative runs of the opposed belts lie generally horizontal, and comprising, restraining the cereal flakes from lateral escape from between the confronting runs of the opposed belts by exerting laterally inwardly directed opposed forces on the opposite edges of the cereal flakes throughout substantially their entire length of travel between the opposed confronting runs of the opposed belts of the compressor mechanism.

3. A method according to claim 1, wherein said laterally inwardly directed opposed forces on the opposite edges of the cereal flakes traveling through the compressor mechanism are exerted by elongated members traveling with the opposed belts at substantially the same speed as the belts.

4. A method according to claim 3 wherein said elongated members at least substantially engage the side edges of the confronting operative runs of the opposed belts, whereby to close the side edges of the grain flakes comprising passage through the compressor mechanism.

5. A method according to claim 3, wherein said elongated members traveling with the opposed belts are third and fourth belts disposed at the respective sides of the first mentioned opposed first and second belts, the operative runs of the third and fourth belts traveling at the same speed and in the same direction as the operative runs of the first and second belts.

6. A method according to claim 1, wherein only cooked, tempered, flaked cereal grains are fed into the continuous compressor mechanism, and the cereal flakes are uncoated and self-bonded in the compressed sheet issuing from the compressor mechanism.

7. A method according to claim 1, wherein the belts of the compressor mechanism are disposed with their opposing runs at least generally straight and horizontal and with one above the other, and wherein said generally straight runs terminate in substantially the same vertical transverse plane at the exit end of the compressor mechanism, comprising continuously removing the compressed sheet from the lower belt after the sheet has emerged from the most constricted zone of the flake-compressing pass between the belts at the exit end of the compressor mechanism.

8. A method according to claim 7, wherein at the exit end of the compressor mechanism the lower belt runs downwardly about a drum, and comprising lifting the sheet off the said drum at a zone part way down the drum by presenting a scraper-like form-supporting member to the lower belt.

9. A method according to claim 8, wherein the scraper-like form-supporting member is a further belt conveyor having an entering end which is presented to said drum of narrow V vertical section, and driving said further belt conveyor at substantially the same speed and direction as the belts of the compressor mechanism.

10. A method of preparing a cereal product in biscuit form, comprising adding water to the cereal grains and cooking such mixture until the grains are in condition, after flaking, to become self-adherent, under pressure, storing the cooked cereal to temper it by bringing it to a substantially uniform temperature and moisture content, flaking the tempered cooked cereal grains, feeding the cereal flakes to a compressor mechanism which produces an elongated sheet of substantially uniform section therefrom, cutting the sheet into a plurality of similar biscuits, and baking the biscuits by passing them through an oven on a conveyor while they are unconfined both on their tops and peripheries.

11. A method according to claim 10, wherein the cooked, tempered flaked cereal grains are continuously fed into the compressor mechanism and continuously issue therefrom as said compressed sheet, and wherein the said sheet is cut into biscuits while the sheet continues to travel away from the compressor mechanism.

12. A method according to claim 11, comprising first cutting the sheet into a plurality of similar stick-like members extending transversely of the direction of travel of the sheet, then cutting such into biscuits by cuts extending transversely of the stick-like members.

13. A method according to claim 12, wherein the sheet is cut into stick-like members by a gang saw which is reciprocated angularly across the path of travel of the sheet, whereby to move synchronously with the longitudinal movement of the sheet while moving across the sheet.

References Cited

UNITED STATES PATENTS

| | | | |
|---|---|---|---|
| 451,059 | 4/1891 | Laughoff | 99—80 R |
| 901,455 | 10/1908 | Laughoff | 99—83 |
| 903,586 | 10/1908 | Laughoff | 99—80 R |
| 2,437,150 | 3/1948 | Berg | 99—83 |

RAYMOND N. JONES, Primary Examiner